US010273362B2

(12) United States Patent
Zhang et al.

(10) Patent No.: US 10,273,362 B2
(45) Date of Patent: Apr. 30, 2019

(54) POLY(PHENYLENE ETHER) COMPOSITION AND ARTICLE

(71) Applicant: SABIC GLOBAL TECHNOLOGIES B.V., Bergen op Zoom (NL)

(72) Inventors: Fen Zhang, Shanghai (CN); Mingcheng Guo, Shanghai (CN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/569,292

(22) PCT Filed: May 25, 2015

(86) PCT No.: PCT/CN2015/079736
§ 371 (c)(1),
(2) Date: Oct. 25, 2017

(87) PCT Pub. No.: WO2016/187791
PCT Pub. Date: Dec. 1, 2016

(65) Prior Publication Data
US 2018/0072886 A1 Mar. 15, 2018

(51) Int. Cl.
*C08L 83/12* (2006.01)
*C08G 77/46* (2006.01)
*C08K 5/523* (2006.01)
*C08L 33/06* (2006.01)
*C08L 53/00* (2006.01)
*C08L 71/12* (2006.01)

(52) U.S. Cl.
CPC .............. *C08L 83/12* (2013.01); *C08G 77/46* (2013.01); *C08K 5/523* (2013.01); *C08L 33/068* (2013.01); *C08L 53/00* (2013.01); *C08L 71/12* (2013.01); *C08L 2201/02* (2013.01)

(58) Field of Classification Search
None
See application file for complete search history.

(56) References Cited

U.S. PATENT DOCUMENTS

| | | | | |
|---|---|---|---|---|
| 3,247,285 A | | 4/1966 | Belanger | |
| 3,383,372 A | | 5/1968 | Spivey | |
| 4,166,055 A | * | 8/1979 | Lee, Jr. | C08L 71/123 524/141 |
| 4,315,086 A | * | 2/1982 | Ueno | C08K 5/0008 524/105 |
| 4,454,284 A | * | 6/1984 | Ueno | C08L 23/08 524/427 |
| 4,728,461 A | | 3/1988 | Fujii et al. | |
| 4,871,800 A | * | 10/1989 | Fujii | C08G 65/44 525/68 |
| 4,914,153 A | * | 4/1990 | Togo | C08L 51/06 525/145 |
| 5,079,295 A | * | 1/1992 | Furuta | C08L 23/10 525/148 |
| 5,112,913 A | | 5/1992 | Horiuchi et al. | |
| 5,262,478 A | * | 11/1993 | Nishio | C08L 71/123 524/504 |
| 5,264,487 A | * | 11/1993 | Scobbo, Jr. | C08J 11/04 521/41 |
| 5,334,636 A | * | 8/1994 | Fujii | C08K 3/04 524/449 |
| 5,415,906 A | * | 5/1995 | Miyakawa | B32B 7/02 428/35.7 |
| 5,625,000 A | * | 4/1997 | Furuta | C08G 65/485 525/132 |
| 5,939,490 A | | 8/1999 | Brown et al. | |
| 6,303,708 B1 | * | 10/2001 | Brown | C08G 65/485 525/189 |
| 6,670,042 B2 | * | 12/2003 | Furuta | C08J 5/18 361/301.1 |
| 7,084,347 B2 | * | 8/2006 | Mhetar | H01B 3/427 174/110 R |
| 7,517,927 B2 | * | 4/2009 | Kosaka | C08L 23/02 524/115 |
| 7,772,322 B2 | * | 8/2010 | Kosaka | C08L 71/12 525/88 |
| 7,776,441 B2 | * | 8/2010 | Mhetar | C08L 53/00 174/110 R |

(Continued)

FOREIGN PATENT DOCUMENTS

| | | |
|---|---|---|
| CN | 102558783 A | 7/2012 |
| CN | 104277446 A | 1/2015 |

(Continued)

OTHER PUBLICATIONS

International Search Report; International Application No. PCT/CN20151079736; International Filing Date May 25, 2015; dated Jan. 26, 2016; 4 pages.
JP2008133328A; Machine Translation; Date of Publication: Jun. 12, 2008; 27 pages.
Lotader Glycidyl Methacrylate (GMA), Jun. 2004; www.lotader.com.
Plastics Additives Handbook, 2nd Edition, R. Gaechter and H. Mueller (Eds), P.P. Klemchuck (Assoc. Ed.), Hansen Publishers, New York 1993.

(Continued)

Primary Examiner — Robert S Loewe
(74) Attorney, Agent, or Firm — Cantor Colburn LLP

(57) ABSTRACT

A poly(phenylene ether) composition comprises, based on the total weight of the poly(phenylene ether), addition polymer, impact modifier, and flame retardant: 40 to 90 weight percent of a poly(phenylene ether); 1 to 20 weight percent of an addition polymer comprising repeat units derived from a glycidyl ester of an α,β-ethylenically unsaturated acid; 1 to 20 weight percent of an impact modifier other than the addition polymer; and 5 to 20 weight percent of a flame retardant comprising an organophosphate ester. The composition is useful for molding articles.

20 Claims, No Drawings

(56) References Cited

U.S. PATENT DOCUMENTS

| | | | |
|---|---|---|---|
| 8,017,697 B2 | 9/2011 | Carrillo et al. | |
| 8,530,552 B1* | 9/2013 | Takamura | C08L 71/12 524/127 |
| 8,592,549 B1* | 11/2013 | Grcev | C08J 3/226 528/328 |
| 8,669,332 B2 | 3/2014 | Carrillo et al. | |
| 8,722,789 B2* | 5/2014 | Sharma | C08K 5/521 524/508 |
| 8,858,839 B2* | 10/2014 | Gounder | C08L 71/12 252/500 |
| 8,912,261 B2 | 12/2014 | Takamura | |
| 2004/0108623 A1 | 6/2004 | Deeter et al. | |
| 2007/0049690 A1 | 3/2007 | Borade et al. | |
| 2010/0139944 A1* | 6/2010 | Guo | C08L 71/12 174/110 SR |
| 2013/0030096 A1 | 1/2013 | Lietzau | |
| 2013/0142979 A1* | 6/2013 | Edwards | C08L 71/12 428/36.92 |
| 2013/0197167 A1* | 8/2013 | Carrillo | C08L 83/12 525/92 A |
| 2014/0066551 A1* | 3/2014 | Grcev | H01B 3/47 524/100 |
| 2014/0073725 A1 | 3/2014 | Tople et al. | |
| 2014/0128522 A1* | 5/2014 | Lietzau | C08K 5/52 524/122 |

FOREIGN PATENT DOCUMENTS

| | | |
|---|---|---|
| JP | 2008133328 A | 6/2008 |
| WO | 2016187791 A1 | 12/2016 |

OTHER PUBLICATIONS

Written Opinion of the International Searching Authority; International Application No. PCT/CN2015/079736; International Filing Date May 25, 2015; dated Jan. 26, 2016; 5 pages.

* cited by examiner

POLY(PHENYLENE ETHER) COMPOSITION AND ARTICLE

CROSS REFERENCE TO RELATED APPLICATION

This application is a National Stage application of PCT/CN2015/079736, filed May 25, 2015, the disclosure of which is incorporated by reference in its entirety herein.

BACKGROUND OF THE INVENTION

Poly(phenylene ether)s are a class of plastics known for excellent heat resistance, water resistance, dimensional stability, dielectric properties, and inherent flame resistance. Poly(phenylene ether) properties such as impact strength, stiffness, flame resistance, heat resistance, and chemical resistance can be improved by blending it with various other plastics and additives in order to meet the requirements of a wide variety of parts, including plumbing fixtures, electrical boxes, automotive parts, printed circuit boards, and insulation for wire and cable.

Flame resistance is a requirement for many applications. Flame resistance of poly(phenylene ether) can be improved by blending it with environmental friendly flame retardants such as organophosphate esters. Advantageously, certain organophosphate esters can also impart improved melt flow. However, the use of organophosphate esters can also adversely affect impact strength and elongation. It is desirable to have a poly(phenylene ether) composition that exhibits good flame resistance without sacrificing impact strength, elongation, or melt flow.

BRIEF DESCRIPTION OF THE INVENTION

A poly(phenylene ether) composition comprises, based on the total weight of the poly(phenylene ether), addition polymer, impact modifier, and flame retardant: 40 to 90 weight percent of a poly(phenylene ether); 1 to 20 weight percent of an addition polymer comprising repeat units derived from a glycidyl ester of an α,β-ethylenically unsaturated acid; 1 to 20 weight percent of an impact modifier other than the addition polymer; and 5 to 20 weight percent of a flame retardant comprising an organophosphate ester.

In some embodiments, the composition comprises: 60 to 90 weight percent of a poly(phenylene ether) selected from one or more of a poly(2,6-dimethyl-4-phenylene ether) and a poly(2,6-dimethyl-4-phenylene ether)-co-poly(dimethylsiloxane) block copolymer comprising a poly(2,6-dimethyl-4-phenylene ether) block and a poly(dimethylsiloxane) block comprising, on average, 20 to 80 dimethylsiloxane repeat units, and based on the total weight of the poly(2,6-dimethyl-4-phenylene ether)-co-poly(dimethylsiloxane) block copolymer, 1 to 30 weight percent dimethylsiloxane repeat units and 70 to 99 weight percent 2,6-dimethyl-4-phenylene ether repeat units; wherein the poly(phenylene ether) has an intrinsic viscosity of 0.3 to 0.6 deciliter per gram, measured at 25° C. in chloroform; 1 to 5 weight percent of an addition polymer selected from one or more of poly(ethylene-co-glycidyl methacrylate) and poly(ethylene-co-methyl acrylate-co-glycidyl methacrylate); 5 to 20 weight percent of an impact modifier selected from one or more of rubber-modified polystyrene and polystyrene-poly(ethylene-butylene)-polystyrene triblock copolymer, having a weight average molecular weight of 200,000-400,000 daltons; and 0.1 to 10 weight percent, based on the total weight of the composition, of one or more additives selected from the group consisting of flame retardants other thane the organophosphate ester, fillers, processing aids, mold release agents, pigments, dyes, acid quenchers, metal deactivators, antioxidants, light stabilizers, and drip retardants.

An article comprises the composition comprising, based on the total weight of the poly(phenylene ether), addition polymer, impact modifier, and flame retardant: 40 to 90 weight percent of a poly(phenylene ether); 1 to 20 weight percent of an addition polymer comprising repeat units derived from a glycidyl ester of an α,β-ethylenically unsaturated acid; 1 to 20 weight percent of an impact modifier other than the addition polymer; and 5 to 20 weight percent of a flame retardant comprising an organophosphate ester.

DETAILED DESCRIPTION OF THE INVENTION

The present inventors have determined that the adverse effect of organophosphate ester flame retardants on the impact strength and tensile elongation of poly(phenylene ether) compositions can be offset by use of addition polymers comprising repeat units derived from glycidyl methacrylate. Surprisingly, the addition polymer has minimal adverse effect on melt flow. Thus, a thermoplastic composition having an advantageous combination of good flame retardance, impact strength, elongation, and melt flow comprises: based on the total weight of the poly(phenylene ether), addition polymer, impact modifier, and flame retardant: 40 to 90 weight percent of a poly(phenylene ether); 1 to 20 weight percent of an addition polymer comprising repeat units derived from glycidyl methacrylate; 1 to 20 weight percent of an impact modifier other than the addition polymer; and 5 to 20 weight percent of a flame retardant comprising an organophosphate ester.

The composition comprises a poly(phenylene ether). The poly(phenylene ether) can comprise repeat units having the structure:

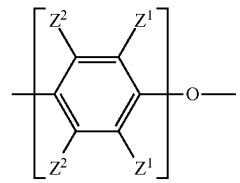

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms.

As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is specifically described as substituted, it can contain heteroatoms other than the carbon and hydrogen members of the substituent residue. Thus, when described as substituted, the hydrocarbyl residue contains one or more heteroatoms such as a halogen, oxygen, nitrogen, sulfur, phosphorus, or silicon. When specifically described as substituted, the hydrocarbyl residue can also contain one or more carbonyl groups, amino groups, hydroxyl groups, or the like, or it can contain heteroatoms within the backbone of the hydrocarbyl residue. As one example, $Z^1$ can be a di-n-butylaminomethyl group formed by reaction of a 3,5-dimethyl-1,4-phenyl group with the di-n-butylamine component of an oxidative polymerization catalyst. As another example, $Z^1$ can be a morpholinomethyl group formed by reaction of a 3,5-dimethyl-1,4-phenyl group with the morpholine component of an oxidative polymerization catalyst.

The poly(phenylene ether) can be a homopolymer, a copolymer, a graft copolymer, an ionomer, a block copolymer, or a combination thereof. The poly(phenylene ether) can be monofunctional. For example, it can have a functional group at one terminus of the polymer chains. The poly(phenylene ether) can also be bifunctional, having a functional group on both termini of the polymer chains. The functional group can be, for example, a hydroxyl group or a (meth)acrylate group.

The poly(phenylene ether) can comprise repeat units selected from the group consisting of 2,6-dimethyl-1,4-phenylene ether repeat units, 2,3,6-trimethyl-1,4-phenylene ether repeat units, 2-methyl-6-phenyl-1,4-phenylene ether repeat units, and a combination thereof. In some embodiments, the poly(phenylene ether) comprises poly(2,6-dimethyl-1,4-phenylene ether). The poly(2,6-dimethyl-1,4-phenylene ether) can have an intrinsic viscosity of 0.2 to 1.5 deciliter per gram, specifically 0.3 to 1.0 deciliters per gram, and more specifically 0.3 to 0.6 deciliters per gram, as measured in chloroform at 25° C. For poly(2,6-dimethyl-1,4-phenylene ether), an intrinsic viscosity of 0.3 to 0.6 deciliters per gram corresponds to a number average molecular weight range of 16,000 to 25.000 daltons. Thus, in some embodiments, the poly(phenylene ether) comprises a poly(2,6-dimethyl-4-phenylene ether) having an intrinsic viscosity of 0.3 to 0.6 deciliter per gram, measured at 25° C. in chloroform. In specific embodiments, the poly(phenylene ether) comprises poly(2,6-dimethyl-1,4-phenylene ether) having an intrinsic viscosity of 0.46, 0.4, or 0.3 deciliters per gram. Poly(2,6-dimethyl-1,4-phenylene ether) can be obtained from SABIC Innovative Plastics as PPO™ 646, PPO™ 640, or PPO™ 630, having intrinsic viscosities of 0.46, 0.40, and 0.30 deciliters per gram, respectively.

The poly(phenylene ether) can comprise a poly(phenylene ether)-polysiloxane block copolymer. As used herein, the term "poly(phenylene ether)-polysiloxane block copolymer" refers to a block copolymer comprising at least one poly(phenylene ether) block and at least one polysiloxane block. The poly(phenylene ether)-polysiloxane block copolymer can be prepared by oxidative copolymerization. The poly(phenylene ether)-polysiloxane block copolymer is the product of a process comprising oxidatively copolymerizing a monomer mixture comprising a monohydric phenol and a hydroxyaryl-terminated polysiloxane. In some embodiments, the monomer mixture comprises, based on the total weight of the monohydric phenol and the hydroxyaryl-terminated polysiloxane, 70 to 99 parts by weight of the monohydric phenol and 1 to 30 parts by weight of the hydroxyaryl-terminated polysiloxane having 20 to 80 siloxane repeat units on average. The poly(phenylene ether)-polysiloxane block copolymer can have an intrinsic viscosity of 0.3 to 0.6 deciliter per gram, measured at 25° C. in chloroform. Thus in some embodiments, the poly(phenylene ether) comprises a poly(phenylene ether)-polysiloxane block copolymer comprising: a poly(phenylene ether) block and a polysiloxane block comprising 20 to 80 siloxane repeat units on average; and based on the total weight of the poly(phenylene ether)-polysiloxane block copolymer, 1 to 30 weight percent siloxane repeat units and 70 to 99 weight percent phenylene ether repeat units; wherein the poly (phenylene ether)-polysiloxane block copolymer has an intrinsic viscosity of 0.3 to 0.6 deciliter per gram, measured at 25° C. in chloroform.

The hydroxyaryl-determinated polysiloxane can comprise a plurality of repeating units having the structure:

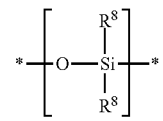

wherein each occurrence of $R^8$ is independently hydrogen, $C_1$-$C_{12}$ hydrocarbyl or $C_1$-$C_{12}$ halohydrocarbyl; and two terminal units having the structure:

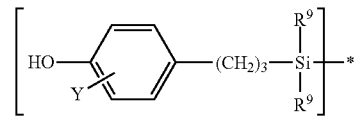

wherein Y is hydrogen. $C_1$-$C_{12}$ hydrocarbyl, $C_1$-$C_{12}$ hydrocarbyloxy, or halogen, and wherein each occurrence of $R^9$ is independently hydrogen, $C_1$-$C_{12}$ hydrocarbyl or $C_1$-$C_{12}$ halohydrocarbyl. In a specific embodiment, each occurrence of $R^8$ and $R^9$ is methyl, and Y is methoxyl.

The monohydric phenol can comprise 2,6-dimethylphenol, and the hydroxyaryl-terminated polysiloxane can have the structure:

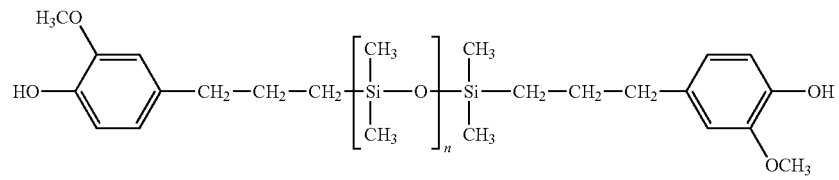

wherein n is, on average, 5 to 100, specifically 30 to 60. Thus in some embodiments, the poly(phenylene ether) block comprises phenylene ether repeat units having the structure:

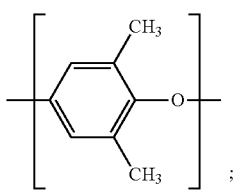

and the polysiloxane block has the structure:

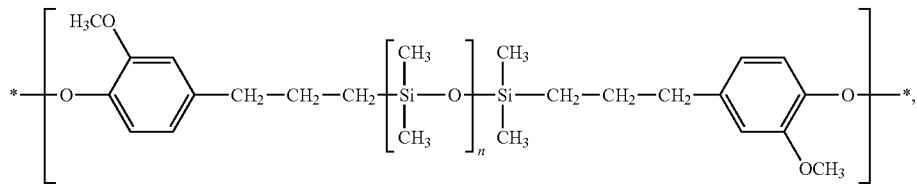

wherein n is 30 to 60.

The oxidative copolymerization method produces poly(phenylene ether)-polysiloxane block copolymer as the desired product and poly(phenylene ether) (without an incorporated polysiloxane block) as a by-product. It is not necessary to separate the poly(phenylene ether) from the poly(phenylene ether)-polysiloxane block copolymer. The poly(phenylene ether)-polysiloxane block copolymer can thus be utilized as a "reaction product" that includes both the poly(phenylene ether) and the poly(phenylene ether)-polysiloxane block copolymer. Certain isolation procedures, such as precipitation from isopropanol, make it possible to assure that the reaction product is essentially free of residual hydroxyaryl-terminated polysiloxane starting material. In other words, these isolation procedures assure that the polysiloxane content of the reaction product is essentially all in the form of poly(phenylene ether)-polysiloxane block copolymer. Detailed methods for forming poly(phenylene ether)-polysiloxane block copolymers are described in U.S. Pat. Nos. 8,017,697 and 8,669,332 to Carrillo et al.

The composition comprises, based on the total weight of the poly(phenylene ether), addition polymer, impact modifier, and flame retardant, 40 to 90 weight percent, specifically 50 to 90 weight percent, and more specifically, 60 to 90 weight percent of the poly(phenylene ether).

In addition to the poly(phenylene ether), the composition further comprises an addition polymer comprising repeat units derived from a glycidyl ester of an α,β-ethylenically unsaturated acid. The glycidyl ester can have the structure:

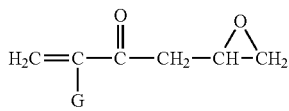

wherein $R^1$ is hydrogen or a $C_{1-10}$ alkyl. Examples of glycidyl ester include glycidyl acrylate, glycidyl methacrylate, and glycidyl ethacrylate. In some embodiments, the glycidyl ester is glycidyl methacrylate. In addition to the glycidyl ester, the addition polymer can further comprise repeat units derived from an α-olefin, for example ethylene, propylene, 1-butene, and 1-hexene. In some embodiments, the α-olefin is ethylene. The addition polymer can optionally further comprise repeat units derived from a vinyl ester or a $C_{1-12}$ alkyl (meth)acrylate. Examples of vinyl esters include vinyl acetate and vinyl propionate. Examples of alkyl (meth)acrylates include methyl acrylate, ethyl acrylate, butyl acrylate, 2-ethylhexyl acrylate, methyl methacrylate, ethyl methacrylate, butyl methacrylate, and 2-ethylhexyl methacrylate. In some embodiments, the (meth)acrylate ester is methyl acrylate. Thus the addition polymer can be a copolymer of a glycidyl ester of an α,β-ethylenically unsaturated acid and an α-olefin or a terpolymer of a glycidyl ester of an α,β-ethylenically unsaturated acid, an α-olefin, and a vinyl ester or $C_{1-12}$ alkyl (meth)acrylate. In some embodiments, the addition polymer comprises 60 to 99 weight percent α-olefin repeat units, 0.1 to 20 weight percent glycidyl ester of an α,β-ethylenically unsaturated acid repeat units, and 0 to 39 weight percent vinyl ester or $C_{1-12}$ alkyl (meth)acrylate repeat units. Examples of the addition polymers include poly(ethylene-co-glycidyl acrylate), poly(ethylene-co-glycidyl methacrylate), poly(ethylene-co-glycidyl methacrylate-co-methyl acrylate), poly(ethylene-co-glycidyl methacrylate-co-ethyl acrylate), and poly(ethylene-co-glycidyl methacrylate-co-vinyl acetate). In some embodiments, the addition polymer is selected from one or more of poly(ethylene-co-glycidyl methacrylate) and poly(ethylene-co-methyl acrylate-co-glycidyl methacrylate). Examples of conmercially available addition polymers include LOTADER™ AX8840 (E-GMA), and LOTADER™ AX8900, AX8920, and AX8950 (E-GMA-MA). Addition polymers are also available from Sumitomo as IGETABOND™ products, for example IGETABOND™ 7L (E-GMA-MA).

The composition comprises, based on the total weight of the poly(phenylene ether), addition polymer, impact modifier, and flame retardant, 1 to 20 weight percent of the addition polymer. Within this range, the composition can comprise greater than or equal to 1 weight percent and less than or equal to 10, 5, 4, 3, or 2 weight percent of the addition polymer. The addition polymer can have an adverse affect on flame resistance. Therefore the maximum amount of addition polymer can depend upon the desired degree of flame resistance, i.e. V-0, V-1, or V-2 under UL-94. For example, the flame resistance rating can be V-0 under UL-94, when the amount of addition polymer is 1 to less than 5 weight percent, specifically 1 to 4 weight percent, and more specifically 1 to 3 weight percent.

In addition to the poly(phenylene ether) and addition polymer, the composition further comprises an impact modifier other than the addition polymer. In some embodiments, the impact modifier is selected from one or more of a rubber-modified poly(alkenyl aromatic monomer) and a hydrogenated, partially hydrogenated, or non-hydrogenated block copolymer of an alkenyl aromatic monomer and a conjugated diene. The impact modifier can be, for example, a rubber-modified poly(alkenyl aromatic monomer), which comprises a dispersed rubber phase and a continuous rigid phase of poly(alkenyl aromatic monomer), for example polystyrene. The rubber-modified poly(alkenyl aromatic monomer) is compatible with the poly(phenylene ether), and can increase the impact strength of the composition.

The alkenyl aromatic monomer used to prepare the continuous rigid phase of the rubber-modified poly(alkenyl aromatic) can have the chemical structure:

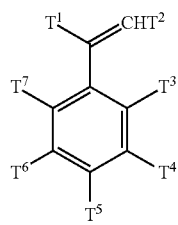

wherein $T^1$ and $T^2$ each independently represent a hydrogen atom, a $C_1$-$C_8$ alkyl group, or a $C_2$-$C_8$ alkenyl group. $T^3$ and $T^7$ each independently represent a hydrogen atom, a chlorine atom, a bromine atom, or a $C_1$-$C_8$ alkyl group; and $T^4$, $T^5$, and $T^6$ each independently represent a hydrogen atom, a chlorine atom, a bromine atom, a $C_1$-$C_8$ alkyl group, or a $C_2$-$C_8$ alkenyl group, or $T^4$ and $T^5$ taken together with the aryl ring forms a naphthyl group, or $T^5$ and $T^6$ taken together with the aryl ring form a naphthyl group. Specific alkenyl aromatic monomers include, for example, styrene, chlorostyrenes such as p-chlorostyrene, methylstyrenes such as alpha-methylstyrene and p-methylstyrene, tert-butylstyrene such as 3-tert-butylstyrene and 4-tert-butylstyrene, and divinyl benzenes such as 1,3-divinylbenzene and 1,4-divinyl benzene.

The dispersed rubber phase of the rubber-modified poly (alkenyl aromatic monomer) comprises a $C_{4-20}$ conjugated diene. Specific conjugated dienes include 1,3-butadiene, 2-methyl-1,3-butadiene, 2-chloro-1,3-butadiene, 2,3-dimethyl-1,3-butadiene, 1,3-pentadiene, 1,3-hexadiene, and a combination thereof. The conjugated diene can be 1,3-butadiene, 2-methyl-1,3-butadiene, or a combination thereof. In some embodiments, the conjugated diene comprises 1,3-butadiene.

Examples of rubber-modified poly(alkenyl aromatic monomer)s are rubber-modified polystyrenes. Rubber-modified polystyrenes, which are sometimes referred to as "high-impact polystyrenes" or "HIPS", comprise polystyrene and polybutadiene. In some embodiments, the rubber-modified polystyrene comprises 80 to 96 weight percent, specifically 88 to 94 weight percent, polystyrene; and 4 to 20 weight percent, specifically 6 to 12 weight percent, polybutadiene, based on the weight of the rubber-modified polystyrene.

The impact modifier other than the addition polymer can also be, for example, a block copolymer selected from the group consisting of hydrogenated, partially hydrogenated, or non-hydrogenated block copolymers of an alkenyl aromatic monomer and a conjugated diene. For brevity, these copolymers are herein referred to collectively as "block copolymers". The block copolymer can improve the impact strength of the composition.

The alkenyl aromatic monomer and the conjugated diene used to prepare the block copolymer can have the same chemical structures as described above for the rubber modified poly(alkenyl aromatic). In some embodiments, the alkenyl aromatic monomer comprises styrene and the conjugated diene comprises 1,3-butadiene.

The unsaturated aliphatic group content in the block copolymer can be hydrogenated, partially hydrogenated, or non-hydrogenated. The hydrogenated block copolymers have better ultraviolet (UV) stability than non-hydrogenated block copolymers. Thus, it can be advantageous to use hydrogenated block copolymers in parts that are exposed to sunlight. The hydrogenated and partially hydrogenated block copolymers can comprise aliphatic unsaturation that is reduced by at least 50 percent, specifically at least 70 percent, more specifically at least 80 percent, still more specifically at least 90 percent, and yet more specifically at least 95 percent, compared to the same block copolymer that is non-hydrogenated.

Illustrative commercially available hydrogenated block copolymers include the polystyrene-poly(ethylene-propylene) diblock copolymers available from Kraton Polymers as KRATON™ G1701 (having 37 weight percent polystyrene) and G1702 (having 28 weight percent polystyrene); the polystyrene-poly(ethylene-butylene)-polystyrene (SEBS) triblock copolymers available from Kraton Polymers as KRATON™ G1641 (having 34 weight percent polystyrene), G1651 (having 31-33 weight percent polystyrene), and G1654 (having 31 weight percent polystyrene); and the polystyrene-poly(ethylene-ethylene/propylene)-polystyrene (SEEP) triblock copolymers available from Kuraray as SEPTON™ S4044, S4055, S4077, and S4099. Additional commercially available hydrogenated block copolymers include polystyrene-poly(ethylene-butylene)-polystyrene (SEBS) triblock copolymers available from Dynasol as CALPRENE™ CH-6170, CH-7171, CH-6174 and CH-6140; from Kuraray as SEPTON™ 8006 and 8007; and from Asahi as TUFTEC™ H1051; polystyrene-poly(ethylene-propylene)-polystyrene (SEPS) copolymers available from Kuraray as SEPTON™ 2006 and 2007; and oil-extended compounds of these hydrogenated block copolymers available from Kraton Polymers as KRATON™ G4609 and G4610 and from Asahi as TUFTEC™ H1272. Mixtures of two of more hydrogenated block copolymers can be used.

The block copolymer can also be a non-hydrogenated block copolymer. Non-hydrogenated block copolymers are similar to hydrogenated block copolymers, except the residual aliphatic unsaturation in the poly(conjugated diene) blocks is not reduced by hydrogenation. Specific unhydrogenated block copolymers include polystyrene-polybutadiene-polystyrene triblock copolymers (SBS), polystyrene-polyisoprene-polystyrene triblock copolymers (SIS), polystyrene-polybutadiene diblock copolymers (SB), polystyrene-polyisoprene diblock copolymers (SI), and combinations thereof.

The composition comprises, based on the total weight of the poly(phenylene ether), addition polymer, impact modifier, and flame retardant, 1 to 20 weight percent, specifically 5 to 20 weight percent, of the impact modifier other than the addition polymer. In some embodiments, the composition comprises, based on the total weight of the poly(phenylene ether), addition polymer, impact modifier, and flame retardant, 1 to 20 weight percent, specifically 5 to 20 weight percent, of poly(styrene-ethylene/butylene-styrene) triblock copolymer having a weight average molecular weight of 200,000-400,000 daltons, as measured by gel permeation chromatography.

In addition to the poly(phenylene ether), addition polymer, and impact modifier other than the addition polymer, the composition comprises a flame retardant comprising an organophosphate ester. A flame retardant is a chemical compound or mixture of chemical compounds capable of improving the flame resistance of the composition. Exemplary organophosphate ester flame retardants include phosphate esters comprising phenyl groups, substituted phenyl groups, or a combination of phenyl groups and substituted phenyl groups. In some embodiments, the organophosphate ester is a phosphate diester of resorcinol, for example resorcinol bis(diphenyl phosphate) (RDP).

In some embodiments the organophosphate ester is a phosphate diester of a bisphenol having the structure:

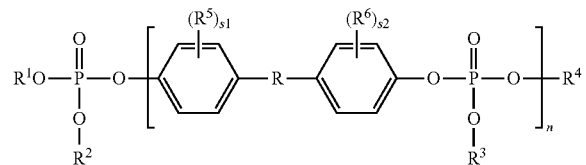

wherein R is independently at each occurrence a $C_1$-$C_{12}$ alkylene group; $R^5$ and $R^6$ are independently at each occurrence a $C_1$-$C_5$ alkyl group; $R^1$, $R^2$, $R^3$, $R^4$ are independently at each occurrence a $C_1$-$C_{12}$ hydrocarbyl group; n is 1 to 25; and s1 and s2 are independently an integer equal to 0, 1, or 2. In some embodiments —$OR^1$, —$OR^2$, —$OR^3$ and —$OR^4$ are independently derived from the corresponding phenol, monoalkylphenol, dialkylphenol, or trialkylphenol. Exemplary bisphenols include 2,2-bis(4-hydroxyphenyl)propane (bisphenol A), 2,2-bis(4-hydroxy-3-methylphenyl)propane, bis(4-hydroxyphenyl)methane, bis(4-hydroxy-3,5-dimethylphenyl)methane and 1,1-bis(4-hydroxyphenyl)ethane. In some embodiments, the bisphenol comprises bisphenol A, and the phosphate diester comprises bisphenol A bis(diphenyl phosphate) (BPADP). In some embodiments, the flame retardant is selected from one or more of bisphenol A bis(diphenyl phosphate) (BPADP) and resorcinol bis(diphenyl phosphate) (RDP).

In some embodiments, the organophosphate ester comprises an organophosphate ester having the formula

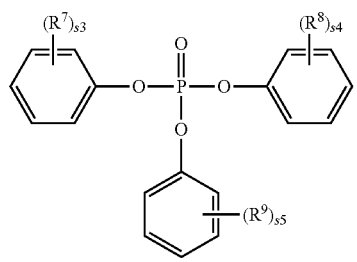

wherein $R^7$, $R^8$ and $R^9$ are independently a $C_1$-$C_{12}$ hydrocarbyl group, and s3, s4 and s5 are independently an integer equal to 0, 1, 2, or 3. For example, the organophosphate ester can be a trisaryl phosphate selected from the group consisting of triphenyl phosphate (CAS Reg. No. 115-86-6), isopropylated triphenyl phosphate (CAS Reg. No. 68937-41-7), isobutylated triphenyl phosphate (CAS Reg. No. 89492-23-9), tris(p-tert-butylphenyl phosphate (CAS Reg. No. 78-33-1), resorcinol bis(diphenyl phosphate) (CAS Reg. No. 57583-54-7), bisphenol A bis(diphenyl phosphate) (CAS Reg. No. 181028-79-5), and a combination thereof.

The flame retardant comprising an organophosphate ester can be used in an effective amount to improve the flame resistance of the composition. For example, the composition can comprise 5 to 20 weight percent, specifically 5 to 15 weight percent, of the flame retardant, based on the combined weight of the poly(phenylene ether), addition polymer, impact modifier, and flame retardant.

In addition to the poly(phenylene ether), addition polymer, impact modifier, and flame retardant, the composition can optionally further comprise a poly(alkenyl aromatic monomer). The alkenyl aromatic monomer used to prepare the poly(alkenyl aromatic monomer) is the same as described above for the rubber-modified poly(alkenyl aromatic monomer) and the block copolymer of an alkenyl aromatic monomer and a conjugated diene.

The alkenyl aromatic monomer can be styrene, and the poly(alkenyl aromatic monomer) can be polystyrene. The polystyrene can be atactic, syndiotactic, or isotactic. In some embodiments, the poly(alkenyl aromatic monomer) comprises polystyrene, specifically atactic polystyrene.

The poly(alkenyl aromatic monomer), for example polystyrene, can be used in an effective amount to increase the melt flow of the composition. Thus, in some embodiments, the composition further comprises, based on the total weight of the poly(phenylene ether), addition polymer, impact modifier, flame retardant, and poly(alkenyl aromatic monomer), 1 to 20 weight percent poly(alkenyl aromatic monomer), for example polystyrene.

The composition can further comprise one or more additives. The additive can be selected from the group consisting of flame retardants other than the organophosphate ester, fillers, processing aids, mold release agents (for example LLDPE), pigments (for example zinc oxide, zinc sulfide, titanium dioxide, and carbon black), dyes, acid quenchers (for example magnesium oxide), metal deactivators (for example zinc sulfide), antioxidants (for example phosphites or thiopropionate esters), light stabilizers (for example benzotriazoles), and drip retardants (for example polytetrafluoroethylene (PTFE) encapsulated with styrene-acrylonitrile copolymer). Thus in some embodiments, the composition consists essentially of the poly(phenylene ether), addition polymer, impact modifier, flame retardant, and 0.1 to 10 weight percent, based on the total weight of the composition, of one or more additives selected from the group consisting of flame retardants other than the organophosphate ester, fillers, processing aids, mold release agents, pigments, dyes, acid quenchers, metal deactivators, antioxidants, light stabilizers, and drip retardants. In some embodiments, the composition consists essentially of the poly(phenylene ether), addition polymer, impact modifier, flame retardant, poly(alkenyl aromatic monomer), and 0.1 to 10 weight percent, based on the total weight of the composition, of one or more additives selected from the group consisting of flame retardants other than the organophosphate ester, fillers, processing aids, release agents, pigments, dyes, acid quenchers, metal deactivators, antioxidants, light stabilizers, and drip retardants.

The composition can further comprise a filler. Fillers include low-aspect ratio fillers, fibrous fillers, and polymeric fillers. Compositions comprising a filler are referred to herein as "filled". Examples of fillers include those described in "Plastic Additives Handbook, 4th Edition", R Gaechter and H. Mueller (Eds.), P. P. Klemchuck (Assoc. Ed.), Hansen Publishers, New York, 1993. The filler can comprise a reinforcing filler. Reinforcing fillers can be in the shape of fibers, acicular crystals, whiskers, flakes, plates, or have other irregular shapes. The average aspect ratio for fibrous, acicular, and whisker-shaped fillers is defined as length:diameter. The average aspect ratio of flaked and plate-like fillers is defined as average diameter of a circle of the same area:average thickness. The average aspect ratio of reinforcing fillers can be greater than 1.5, specifically greater than 3.

Examples of fibrous fillers include glass fibers, carbon fibers, organic polymer fibers, inorganic fibers, natural fibers, filiform fillers (whiskers), and ceramic fibers. In some embodiments, the reinforcing fiber is a glass fiber. Glass fibers can have a modulus of greater than or equal to 6,800 megapascals, and can be chopped or continuous. They can have various cross-sections, for example, round, trapezoidal, rectangular, square, crescent, bilobal, trilobal, and hexagonal. Glass fibers can be in the form of chopped strands having an average length of from 0.1 mm to 10 mm, and having an average aspect ratio of 2 to 5. Glass fibers can be textile glass fibers such as E, A, C, ECR, R, S, D. or NE glasses or quart fibers.

The composition can comprise any combination of the foregoing components. In some embodiments, the composition comprises, based on the total weight of the poly (phenylene ether), addition polymer, and impact modifier: 60 to 90 weight percent of a poly(phenylene ether) selected from one or more of a poly(2,6-dimethyl-4-phenylene ether) and a poly(2,6-dimethyl-4-phenylene ether)-co-poly(dimethylsiloxane) block copolymer comprising a poly(2,6-dimethyl-4-phenylene ether) block and a poly(dimethylsiloxane) block comprising, on average, 20 to 80 dimethylsiloxane repeat units, and based on the total weight of the poly(2,6-dimethyl-4-phenylene ether)-co-poly(dimethylsiloxane) block copolymer, 1 to 30 weight percent dimethylsiloxane repeat units and 70 to 99 weight percent 2,6-dimethyl-4-phenylene ether repeat units; wherein the poly(phenylene ether) has an intrinsic viscosity of 0.3 to 0.6 deciliter per gram, measured at 25° C. in chloroform; 1 to 5 weight percent of an addition polymer selected from one or more of poly(ethylene-co-glycidyl methacrylate) and poly (ethylene-co-methyl acrylate-co-glycidyl methacrylate); 5 to 20 weight percent of an impact modifier selected from one or more of rubber-modified polystyrene and polystyrene-poly(ethylene-butylene)-polystyrene triblock copolymer, having a weight average molecular weight of 200,000-400,000 daltons; and 0.1 to 10 weight percent, based on the total weight of the composition, of one or more additives selected from the group consisting of flame retardants other thane the organophosphate ester, fillers, processing aids, mold release agents, pigments, dyes, acid quenchers, metal deactivators, antioxidants, light stabilizers, and drip retardants.

The composition has a combination of advantageous physical properties which make it suited for use in flame resistant poly(phenylene ether) molding compositions, including improved impact resistance and tensile elongation, while having minimal impact on melt flow. In particular, the adverse effect of organophosphate ester flame retardants on impact strength and tensile elongation can be offset by the use of addition polymers comprising repeat units derived from glycidyl methacrylate. Surprisingly, the addition polymer has minimal adverse effect on melt flow. Thus In some embodiments, the composition exhibits one or more of: an increase in notched Izod impact strength at 23° C. of 5 to 100 percent compared to the same composition without the addition polymer, when measured with a pendulum energy of 5 foot-pound force (ft·lbf) and an impact velocity of 3.5 meters per second (m/sec) according to ASTM D 256-10; and an increase in tensile elongation at break at 23° C. of 2 to 200 percent compared to the same composition without the addition polymer, when measured according to ASTM D638-10. When the poly(phenylene ether) is poly(2,6-dimethyl-4-phenylene ether), the composition exhibits one or more of: an increase in notched Izod impact strength at 23° C. of 30 to 100 percent compared to the same composition without the addition polymer, when measured with a pendulum energy of 5 ft·lbf and an impact velocity of 3.5 m/sec according to ASTM D 256-10; and an increase in tensile elongation at break at 23° C. of 10 to 200 percent compared to the same composition without the addition polymer, when measured according to ASTM D638-10.

A method of forming the composition comprises compounding, or melt blending, the individual components. The melt blending can be performed using known equipment such as ribbon blenders, Henschel mixers, Banbury mixers, drum tumblers, single-screw extruders, twin-screw extruders, multi-screw extruders, or co-kneaders. For example, the composition can be prepared by melt-blending the components in a twin-screw extruder at a temperature of 250 to 350° C., specifically 280 to 320° C. In some embodiments, all of the components except the flame retardant are pre-mixed and compounded on a twin-screw extruder, and the flame retardant is added in a middle zone of the extruder. All of the above-described variations in the composition apply as well to the method of preparing the composition.

The composition can be formed into articles by shaping, extruding, or molding. Articles can be molded from the composition by known methods, such as injection molding, injection compression molding, gas assist injection molding, rotary molding, blow molding, compression molding, and related molding processes. In some embodiments, the article is formed by injection molding. The injection molding conditions can include a barrel temperature of 240 to 350° C. specifically 250 to 310° C., and a mold temperature of 50 to 100° C., specifically 60 to 90° C. Thus in some embodiments, an article comprises a composition comprising, based on the total weight of the poly(phenylene ether), addition polymer, impact modifier, and flame retardant: 40 to 90 weight percent of a poly(phenylene ether); 1 to 20 weight percent of an addition polymer comprising repeat units derived from a glycidyl ester of an α,β-ethylenically unsaturated acid; 1 to 20 weight percent of an impact modifier other than the addition polymer; and 5 to 20 weight percent of flame retardant comprising an organophosphate ester.

All of the above-described variations in the composition apply as well to the article comprising the composition. For example, in some embodiments, an article comprises a composition comprises, based on the total weight of the poly(phenylene ether), addition polymer, and impact modifier: 60 to 90 weight percent of a poly(phenylene ether) selected from one or more of a poly(2,6-dimethyl-4-phenylene ether) and a poly(2,6-dimethyl-4-phenylene ether)-co-poly(dimethylsiloxane) block copolymer comprising a poly(2,6-dimethyl-4-phenylene ether) block and a poly(dimethylsiloxane) block comprising, on average, 20 to 80 dimethylsiloxane repeat units, and based on the total weight of the poly(2,6-dimethyl-4-phenylene ether)-co-poly(dimethylsiloxane) block copolymer, 1 to 30 weight percent dimethylsiloxane repeat units and 70 to 99 weight percent 2,6-dimethyl-4-phenylene ether repeat units; wherein the poly(phenylene ether) has an intrinsic viscosity of 0.3 to 0.6 deciliter per gram, measured at 25° C. in chloroform 1 to 5 weight percent of an addition polymer selected from one or more of poly(ethylene-co-glycidyl methacrylate) and poly (ethylene-co-methyl acrylate-co-glycidyl methacrylate); 5 to 20 weight percent of an impact modifier selected from one or more of rubber-modified polystyrene and polystyrene-poly(ethylene-butylene)-polystyrene triblock copolymer, having a weight average molecular weight of 200,000-400,000 daltons; and 0.1 to 10 weight percent, based on the total weight of the composition, of one or more additives selected from the group consisting of flame retardants other thane the organophosphate ester, fillers, processing aids, mold release agents, pigments, dyes, acid quenchers, metal deactivators, antioxidants, light stabilizers, and drip retardants.

The invention includes at least the following embodiments.

Embodiment 1

A composition comprising, based on the total weight of the poly(phenylene ether), addition polymer, impact modifier, and flame retardant: 40 to 90 weight percent of a poly(phenylene ether); 1 to 20 weight percent of an addition polymer comprising repeat units derived from a glycidyl ester of an α,β-ethylenically unsaturated acid; 1 to 20 weight percent of an impact modifier other than the addition polymer; and 5 to 20 weight percent of a flame retardant comprising an organophosphate ester.

Embodiment 2

The composition of embodiment 1, wherein the composition further comprises, based on the total weight of the poly(phenylene ether), addition polymer, impact modifier, flame retardant, and poly(alkenyl aromatic monomer), 1 to 20 weight percent of a poly(alkenyl aromatic monomer).

Embodiment 3

The composition of embodiment 1, wherein the composition consists essentially of the poly(phenylene ether), addition polymer, impact modifier, flame retardant, and 0.1 to 10 weight percent, based on the total weight of the composition, of one or more additives selected from the group consisting of flame retardants other than the organophosphate ester, fillers, processing aids, mold release agents, pigments, dyes, acid quenchers, metal deactivators, antioxidants, light stabilizers, and drip retardants.

Embodiment 4

The composition of embodiment 2, wherein the composition consists essentially of the poly(phenylene ether), addition polymer, impact modifier, flame retardant, poly (alkenyl aromatic monomer), and 0.1 to 10 weight percent, based on the total weight of the composition, of one or more additives selected from the group consisting of flame retardants other than the organophosphate ester, fillers, processing aids, mold release agents, pigments, dyes, acid quenchers, metal deactivators, antioxidants, light stabilizers, and drip retardants.

Embodiment 5

The composition of any of embodiments 1-4, wherein the poly(phenylene ether) comprises a poly(2,6-dimethyl-4-phenylene ether) having an intrinsic viscosity of 0.3 to 0.6 deciliter per gram, measured at 25° C. in chloroform.

Embodiment 6

The composition of any of embodiments 1-4, wherein the poly(phenylene ether) comprises a poly(phenylene ether)-polysiloxane block copolymer comprising: a poly(phenylene ether) block and a polysiloxane block comprising 20 to 80 siloxane repeat units on average; and based on the total weight of the poly(phenylene ether)-polysiloxane block copolymer, 1 to 30 weight percent siloxane repeat units and 70 to 99 weight percent phenylene ether repeat units; wherein the poly(phenylene ether)-polysiloxane block copolymer has an intrinsic viscosity of 0.3 to 0.6 deciliter per gram, measured at 25° C. in chloroform.

Embodiment 7

The composition of embodiment 6, wherein the poly (phenylene ether) block comprises phenylene ether repeat units having the structure:

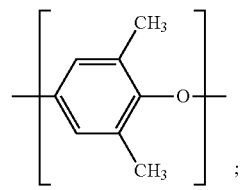

and the polysiloxane block has the structure:

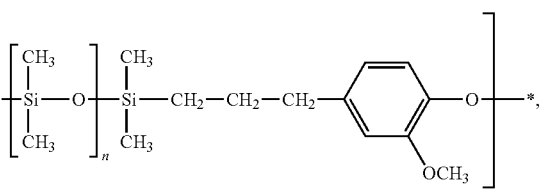

wherein n is 30 to 60.

Embodiment 8

The composition of any of embodiments 1-7, wherein the impact modifier is selected from one or more of a rubber-modified poly(alkenyl aromatic monomer) and a hydrogenated, partially hydrogenated, or non-hydrogenated block copolymer of an alkenyl aromatic monomer and a conjugated diene.

Embodiment 9

The composition of embodiment 8, wherein the alkenyl aromatic monomer comprises styrene and the conjugated diene comprises butadiene.

Embodiment 10

The compositions of any of embodiments 1-9, wherein the addition polymer comprises 60 to 99 weight percent α-olefin repeat units, 0.1 to 20 weight percent glycidyl ester of an α,β-ethylenically unsaturated acid repeat units, and 0 to 39 weight percent vinyl ester or $C_{1-12}$ alkyl (meth)acrylate repeat units.

Embodiment 11

The composition of any of embodiments 1-10, where the addition polymer is selected from one or more of poly (ethylene-co-glycidyl methacrylate) and poly(ethylene-co-methyl acrylate-co-glycidyl methacrylate).

Embodiment 12

The composition of any of embodiments 1-11, wherein the flame retardant is selected from one or more of bisphenol A bis(diphenyl phosphate) (BPADP) and resorcinol bis (diphenyl phosphate) (RDP).

Embodiment 13

The composition of any of embodiments 1-12, comprising: 60 to 90 weight percent of a poly(phenylene ether) selected from one or more of a poly(2,6-dimethyl-4-phenylene ether) and a poly(2,6-dimethyl-4-phenylene ether)-co-poly(dimethylsiloxane) block copolymer comprising a poly(2,6-dimethyl-4-phenylene ether) block and a poly(dimethylsiloxane) block comprising, on average, 20 to 80 dimethylsiloxane repeat units, and based on the total weight of the poly(2,6-dimethyl-4-phenylene ether)-co-poly(dimethylsiloxane) block copolymer, 1 to 30 weight percent dimethylsiloxane repeat units and 70 to 99 weight percent 2,6-dimethyl-4-phenylene ether repeat units; wherein the poly(phenylene ether) has an intrinsic viscosity of 0.3 to 0.6 deciliter per gram, measured at 25° C. in chloroform; 1 to 5 weight percent of an addition polymer selected from one or more of poly(ethylene-co-glycidyl methacrylate) and poly (ethylene-co-methyl acrylate-co-glycidyl methacrylate); 5 to 20 weight percent of an impact modifier selected from one or more of rubber-modified polystyrene and polystyrene-poly(ethylene-butylene)-polystyrene triblock copolymer, having a weight average molecular weight of 200,000-400,000 daltons; and 0.1 to 10 weight percent, based on the total weight of the composition, of one or more additives selected from the group consisting of flame retardants other thane the organophosphate ester, fillers, processing aids, mold release agents, pigments, dyes, acid quenchers, metal deactivators, antioxidants, light stabilizers, and drip retardants.

Embodiment 14

The composition of any of embodiments 1-13, wherein the composition exhibits one or more of: an increase in notched Izod impact strength at 23° C. of 5 to 100 percent compared to the same composition without the addition polymer, when measured with a pendulum energy of 5 ft·lbf and an impact velocity of 3.5 meters per second (m/sec) in according to ASTM D 256-10; and an increase in tensile elongation at break at 23° C. of 10 to 50 weight percent compared to the same composition without the addition polymer, when measured according to ASTM D638-10.

Embodiment 15

An article comprising the composition of any of embodiments 1-14.

EXAMPLES

Abbreviations for materials disclosed in the examples and elsewhere are described below in Table 1.

TABLE 1

| Materials | |
|---|---|
| Item | Description |
| E | Ethylene |
| GMA | Glycidyl methacrylate |
| MA | Methyl acrylate |
| PPE-0.46 | Poly(2,6-dimethyl-1,4-phenylene ether), CAS Reg. No. 25134-01-4, having an intrinsic viscosity of 0.46 deciliter per gram measured in chloroform at 25° C. and a weight average molecular weight of 66,000 daltons; obtained as PPO ™ 646 from SABIC Innovative Plastics. |
| PPE-0.40 | Poly(2,6-dimethyl-1,4-phenylene ether), CAS Reg. No. 25134-01-4, having an intrinsic viscosity of 0.40 deciliter per gram measured in chloroform at 25° C., and a weight average molecular weight of 59,000 daltons; obtained as PPO ™ 640 from SABIC Innovative Plastics. |
| PPE-0.30 | Poly(2,6-dimethyl-1,4-phenylene ether), CAS Reg. No. 25134-01-4, having an intrinsic viscosity of 0.30 deciliter per gram, measured in chloroform at 25° C.; obtained as PPO ™ 630 from SABIC Innovative Plastics. |
| PPE-Si | Poly(2,6-dimethyl-1,4-phenylene ether)-co-poly(dimethylsiloxane) block copolymer, having an intrinsic viscosity of 0.45 deciliter per gram measured in chloroform at 25° C.; prepared from 5 weight percent eugenol capped poly(dimethylsiloxane); obtained as PPE-Siloxane from SABIC Innovative Plastics. |
| BPADP | Bisphenol A bis(diphenyl phosphate), CAS Reg. No. 181028-79-5; obtained as CR-741 from Daihachi Chemical industry Co. |
| RDP | Resorcinol bis(diphenyl phosphate), CAS Reg. No. 57583-54-7; obtained as PhireGuard RDP from Jiangsu Yoke Technology Co. |
| PS | Atactic polystyrene, CAS Reg. No. 9003-53-6, having a melt flow index of about 2.0-2.8 grams per 10 minutes measured at 200° C. and 5 kilogram load; obtained as 686E from Styron. |
| SEBS | High molecular weight poly(styrene-ethylene/butylene-styrene) triblock copolymer, CAS Reg. No. 66070-58-4, having a polystyrene content of 30.0 to 33.0 weight percent and a weight average molecular weight of 240,000-301,000; obtained as KRATON ™ G1651 from Kraton Performance Polymers Inc. |

TABLE 1-continued

Materials

| Item | Description |
|---|---|
| HIPS | High impact polystyrene, CAS Reg. No. 9003-55-8, obtained from Idemitsu. |
| EGMA | Poly(ethylene-co-glycidyl methacrylate), CAS Reg. No. 26,061-90-5, having an ethylene-glycidyl methacrylate weight ratio of 92:8; obtained as LOTADER ™ AX8840 from Arkema. |
| EMAGMA | Poly(ethylene-co-methyl methactylate-co-glycidyl methacrylate), CAS Reg. No. 51541-08-3, having an ethylene-methyl acrylate-glycidyl methacrylate weight ratio of 67:25:8; obtained as LOTADER ™ AX8900 from Arkema. |
| ZnO | Zinc oxide, CAS Reg. No. 1314-13-2, obtained as ZINKOXYD AKTIV ™ from Bayer. |
| ZnS | Zinc sulfide, CAS Reg. No. 1314-98-3, obtained as SACHTOLITH ™ HD-S from Sachtleben Chemie GmbH. |
| CB | Carbon black, CAS Reg. No. 1333-86-4, obtained as CXS439 from Cabot. |
| MgO | Magnesium oxide, CAS Reg. No. 1309-48-4, obtained as KYOWAMAG ™ 150 from Kyowa. |
| LLDPE | Poly(ethylene-co-butylene), CAS Reg. No. 9019-29-8, obtained from SABIC. |
| AO-1 | Tris(2,4-di-tert-butylphenyl) phosphite, CAS Reg. No. 31570-04-4, obtained from BASF. |
| AO-2 | Pentaerythritol tetra(3-laurylthiopropionate), CAS Reg. No. 29598-76-3, obtained from Addivant ™. |

Compositions were compounded using a Toshiba TEM-37BS co-rotating twin-screw extruder with a length to internal diameter ratio (L/D) of 40.5, an internal diameter of 37 millimeters, a barrel temperature setting of at 290° C. from zones 2 to 12, a die temperature setting of 300° C., a screw rotation rate of 400 rotations per minute, and throughput of about 40 kilograms/hour. The liquid flame retardants BPADP and RDP were fed to the extruder via a liquid feeder between barrels 2 and 3. Components in pellet or powder form were typically dry-blended in a plastic bag manually or using a super floater (Kawata SFC-50) prior to being introduced to the extruder at the feed throat. The resulting extruded strands were cooled by passing them through a water bath, and then chopped into pellets. The pellets were dried for three hours at 110° C. prior to use for injection molding.

Articles for property testing were molded by single-shot injection molding. Molding conditions are summarized in Table 2.

TABLE 2

| Condition | Units | Value |
|---|---|---|
| Hopper temperature | ° C. | 23 |
| Zone 1 temperature | ° C. | 290 |
| Zone 2 temperature | ° C. | 300 |
| Zone 3 temperature | ° C. | 300 |
| Zone 4 temperature | ° C. | 300 |
| Mold temperature | ° C. | 90 |
| Screw speed | rpm | 100 |
| Back pressure | kgf/cm² | 65 |
| Decompression | mm | 3 |
| Injection time | sec | 1.287 |
| Holding time | sec | 10 |
| Cooling time | sec | 12 |
| Molding Machine | none | ES3000 |
| Mold Type (insert) | none | ASTM Family |
| Shot volume | mm | 40 |
| Switch point | mm | 10 |
| Injection speed | mm/sec | 50 |
| Holding pressure | kgf/cm² | 700 |
| Max. Injection pressure | kgf/cm² | 800 |
| Transfer pressure | kgf/cm² | 0 |
| Cycle time | sec | 32 |
| Cushion | mm | 8.19 |

Melt mass flow rate (MFR), expressed in grams per 10 minutes, was measured at 300° C. under a load of 5 kilograms according to ASTM D1238-10, Procedure B.

Tensile elongation at break (TE-Break), expressed in percent (%), was measured at 23° C. according to ASTM D638-10.

Notched Izod Impact Strength, expressed in joules per meter (J/m), was measured at 23 and −30° C., with a pendulum energy of 5 ft·lbf and an impact velocity of 3.5 m/sec, according to ASTM D 256-10.

Flammability properties were measured at sample thickness of 1.0 millimeter (mm), according to Underwriter's Laboratory Bulletin 94 "Tests for Flammability of Plastic Materials, UL 94", 20 mm Vertical Burning Flame Test. Before testing, flame bars were conditioned at 23° C. and 50% relative humidity for at least 48 hours. A set of five flame bars was tested for each composition. For each bar, a flame was applied to the bar, then removed, and the time required for the bar to self-extinguish was noted as first flame-out time (FOT, $t_1$). The flame was then reapplied and removed, and the time required for the bar to self-extinguish again was noted as second flame-out time (FOT, $t_2$). The post-flame glowing time (afterglow time, $t_3$) was also noted. To achieve a rating of V-0, the flame-out times $t_1$ and $t_2$ for each individual specimen must be less than or equal to 10 seconds; and the total flame-out time ($t_1+t_2$) for all five specimens must be less than or equal to 50 seconds; the second flame-out time plus the afterglow time ($t_2+t_3$) for each individual specimen must be less than or equal to 30 seconds; no specimen can flame or glow up to the holding clamp; and the cotton indicator cannot be ignited by flaming particles or drops. To achieve a rating of V-1, the flame-out times $t_1$ and $t_2$ for each individual specimen must be less than or equal to 30 seconds; the total flame-out time ($t_1+t_2$) for all five specimens must be less than or equal to 250 seconds; the second flame-out time plus the afterglow time ($t_2+t_3$) for each individual specimen must be less than or equal to 60 seconds; and no specimen can flame or glow up to the holding clamp; and the cotton indicator cannot be ignited by flaming particles or drops. To achieve a rating of V-2, the flame-out times $t_1$ and $t_2$ for each individual specimen must be less than or equal to 30 seconds; the total flame-out time ($t_1+t_2$) for all five specimens must be less than or equal to 250 seconds; the second flame-out time plus the afterglow time ($t_2+t_3$) for each individual specimen must be less than or equal to 60 seconds, and no specimen can flame or glow up to the holding clamp. However the cotton indicator can be ignited by flaming particles or drops.

Examples 1-3 and Comparative Examples 1-3

A set of experiments was performed using PPE with a combination of impact modifier other thane the addition polymer (SEBS or HIPS) and flame retardant (RDP or BPADP). The results are summarized in Table 3. As can be seen from the data, adding 3 wt. % EGMA can improve notched impact and tensile elongation significantly. This effect is more pronounced with SEBS (Ex. 1 and 2) than that with HIPS (Ex. 3).

TABLE 3

| Example | CE-1 | E-1 | CE-2 | E-2 | CE-3 | E-3 |
|---|---|---|---|---|---|---|
| COMPOSITION (parts by weight) | | | | | | |
| PPE-0.40 | 81.20 | 81.20 | — | — | — | — |
| PPE-0.46 | — | — | 84.20 | 84.20 | 66.95 | 66.95 |
| RDP | 9.80 | 9.80 | 7.85 | 7.85 | — | — |
| BPADP | — | — | — | — | 12.76 | 12.76 |
| SEBS | 6.20 | 6.20 | 5.55 | 5.55 | — | — |
| HIPS | — | — | — | — | 18.66 | 18.66 |
| PS | 2.00 | 2.00 | — | — | — | — |
| EGMA | — | 3.00 | — | 3.00 | — | 3.00 |
| AO-1 | 0.10 | 0.10 | — | — | 0.09 | 0.09 |
| ZnO | 0.15 | 0.15 | — | — | — | — |
| ZnS | 0.15 | 0.15 | 0.14 | 0.14 | 0.13 | 0.13 |
| MgO | — | — | 0.27 | 0.27 | 0.13 | 0.13 |
| CB | 1.48 | 1.48 | 0.50 | 0.50 | 0.35 | 0.35 |
| AO-2 | — | — | 1.08 | 1.08 | — | — |
| LLDPE | — | — | 0.90 | 0.90 | 1.28 | 1.28 |
| PROPERTIES | | | | | | |
| MFR, (g/10 min) | 11.1 | 8.15 | 6.71 | 4.82 | 14.5 | 10.2 |
| TE-Break (%) | 9.59 | 13.85 | 8.96 | 11.28 | 7.9 | 8.85 |
| Notched Izod, 23° C. (J/m) | 250 | 356 | 164 | 317 | 105 | 139 |
| Notched Izod, −30° C. (J/m) | 110 | 153 | 75.1 | 134 | 75.6 | 83.1 |
| UL94, 1.0 mm | V-0 | V-0 | V-0 | V-0 | V-0 | V-1 |

Examples 1, 1A, and 1B, and Comparative Example 1

EGMA amounts of 0, to 3.00, 5.00, and 10.00 wt. % were evaluated. The results are summarized in Table 4.

TABLE 4

| | Example | | | |
|---|---|---|---|---|
| | CE-1 | E-1 | E-1a | E-1b |
| COMPOSITIONS (parts by weight) | | | | |
| PPE-0.40 | 81.20 | 81.20 | 81.20 | 81.20 |
| RDP | 9.80 | 9.80 | 9.80 | 9.80 |
| SEBS | 6.20 | 6.20 | 6.20 | 6.20 |
| PS | 2.00 | 2.00 | 2.00 | 2.00 |
| EGMA | — | 3.00 | 5.00 | 10.00 |
| AO-1 | 0.10 | 0.10 | 0.10 | 0.10 |
| ZnO | 0.15 | 0.15 | 0.15 | 0.15 |
| ZnS | 0.15 | 0.15 | 0.15 | 0.15 |
| CB | 1.48 | 1.48 | 1.48 | 1.48 |
| PROPERTIES | | | | |
| MFR (g/10 min) | 11.1 | 8.15 | 8.42 | 4.57 |
| TE-Break (%) | 9.59 | 13.85 | 22.24 | 30.46 |
| Notched Izod, 23° C. (J/m) | 250 | 356 | 382 | 424 |

TABLE 4-continued

| | Example | | | |
|---|---|---|---|---|
| | CE-1 | E-1 | E-1a | E-1b |
| Notched Izod, −30° C. (J/m) | 110 | 153 | 174 | 197 |
| UL94, 1.0 mm | V-0 | V-0 | V-1 | V-1 |

As can be seen from Table 4, notched impact strength and tensile elongation both increased with increased EGMA amount. By adding EGMA in amounts from 3 to 10 wt. %, room temperature (23° C.) impact strength increased by 44% to 70%, low temperature (−30° C.) impact strength increased by 39% to 79%, and tensile elongation increased by 44% to 218%. However, at 10 wt. % EGMA, the melt flow (4.56 g/10 min) was low, and flame resistance was reduced.

Examples 1, 4, and 5 and Comparative Examples 1, 4, and 5

The effect of EGMA on different poly(phenylene ether)'s-poly(2,6-dimethyl-4-phenylene ether)s having intrinsic viscosity of 0.40 dL/g and 0.30 dL/g and poly(2,6-dimethyl-1,4-phenylene ether)-co-poly(dimethylsiloxane) block copolymer having an intrinsic viscosity of 0.45 dL/g—was evaluated. The results are summarized in Table 5.

TABLE 5

| Description | CE-1 | E-1 | CE-4 | E-4 | CE-5 | E-5 |
|---|---|---|---|---|---|---|
| COMPOSITION (parts by weight) | | | | | | |
| PPE-0.40 | 81.20 | 81.20 | — | — | — | — |
| PPE-0.30 | — | — | 81.20 | 81.20 | — | — |
| PPE-Si | — | — | — | — | 81.20 | 81.20 |
| RDP | 9.80 | 9.80 | 9.80 | 9.80 | 9.80 | 9.80 |
| SEBS | 6.20 | 6.20 | 6.20 | 6.20 | 6.20 | 6.20 |
| PS | 2.00 | 2.00 | 2.00 | 2.00 | 2.00 | 2.00 |

TABLE 5-continued

| Description | CE-1 | E-1 | CE-4 | E-4 | CE-5 | E-5 |
|---|---|---|---|---|---|---|
| EGMA | — | 3.00 | — | 3.00 | — | 3.00 |
| AO-1 | 0.10 | 0.10 | 0.10 | 0.10 | 0.10 | 0.10 |
| ZnO | 0.15 | 0.15 | 0.15 | 0.15 | 0.15 | 0.15 |
| ZnS | 0.15 | 0.15 | 0.15 | 0.15 | 0.15 | 0.15 |
| CB | 1.48 | 1.48 | 1.48 | 1.48 | 1.48 | 1.48 |
| PROPERTIES | | | | | | |
| MFR (g/10 min) | 11.1 | 8.15 | 38.9 | 36.8 | 14.4 | 8.84 |
| TE-Break (%) | 9.59 | 13.85 | 7.66 | 10.98 | 12.97 | 13.34 |
| Notched Izod, 23° C. (J/m) | 250 | 356 | 138 | 199 | 388 | 425 |
| Notched Izod, −30° C. (J/m) | 110 | 153 | 71.9 | 103 | 138 | 189 |
| UL94, 1.0 mm | V-0 | V-0 | V-0 | V-0 | V-0 | V-0 |

As can be seen from Table 5, notched impact strength and tensile elongation were improved for all three poly(phenylene ether)s by adding 3 wt. % EGMA.

Examples 1 and 6, and Comparative Example 1

The use of EMAGMA in place of EGMA was evaluated. The results are summarized in Table 6.

TABLE 6

| | Example | | |
|---|---|---|---|
| | CE-1 | E-1 | E-6 |
| COMPOSITION (parts by weight) | | | |
| PPE-0.40 | 81.20 | 81.20 | 81.20 |
| RDP | 9.80 | 9.80 | 9.80 |
| SEBS | 6.20 | 6.20 | 6.20 |
| PS | 2.00 | 2.00 | 2.00 |
| EGMA | — | 3.00 | — |
| EMAGMA | — | — | 3.00 |
| AO-1 | 0.10 | 0.10 | 0.10 |
| ZnO | 0.15 | 0.15 | 0.15 |
| ZnS | 0.15 | 0.15 | 0.15 |
| CB | 1.48 | 1.48 | 1.48 |
| PROPERTIES | | | |
| MFR (g/10 min) | 11.1 | 8.15 | 10.3 |
| TE-Break (%) | 9.59 | 13.85 | 21.67 |
| Notched Izod, 23° C. (J/m) | 250 | 356 | 353 |
| Notched Izod, −30° C. (J/m) | 110 | 153 | 154 |
| UL94, 1.0 mm | V-0 | V-0 | V-0 |

As can be seen from Table 6, notched impact strength and tensile elongation were improved for all three poly(phenylene ether)'s by adding 3 wt. % EGMA.

Example 4 and Comparative Examples 4-6

The effect of EGMA in the presence and absence of flame retardant (RDP) was evaluated. The results are summarized in Table 7.

TABLE 7

| | Example | | | |
|---|---|---|---|---|
| | E-4 | CE-4 | CE-5 | CE-6 |
| COMPOSITION (parts by weight) | | | | |
| PPE-0.30 | 81.20 | 81.20 | 81.20 | 81.20 |
| RDP | 9.80 | 9.80 | — | — |
| SEBS | 6.20 | 6.20 | 6.20 | 6.20 |
| PS | 2.00 | 2.00 | 2.00 | 2.00 |
| EGMA | 3.00 | — | — | 3.00 |
| AO-1 | 0.10 | 0.10 | 0.10 | 0.10 |
| ZnO | 0.15 | 0.15 | 0.15 | 0.15 |
| ZnS | 0.15 | 0.15 | 0.15 | 0.15 |
| CB | 1.48 | 1.48 | 1.48 | 1.48 |
| Total | 104.08 | 101.08 | 91.28 | 94.28 |
| PROPERTIES | | | | |
| MFR (g/10 min) | 36.8 | 38.9 | 9 | 7.57 |
| TE-Break (%) | 10.98 | 7.66 | 21.06 | 33.8 |
| Notched Izod, 23° C. (J/m) | 199 | 138 | 207 | 296 |
| Notched Izod, −30° C. (J/m) | 103 | 71.9 | 107 | 149 |
| UL94, 1.0 mm | V-0 | V-0 | V-2 | V-2 |

As can be seen from Table 7. RDP has a large adverse effect on impact strength in the absence of EGMA (Comp. Ex. 4 vs. Comp. Ex. 5), and EGMA improves impact strength and tensile elongation in the presence (Ex. 4 vs. Comp. Ex. 4) and absence (Comp. Ex. 6 vs. Comp. Ex. 5) of RDP. Surprisingly, when EGMA is added to a composition comprising RDP, impact strength at both 23 and −30° C. are nearly restored to their original values without RDP (Ex. 4 vs. Comp. Ex. 5). It was unexpected that 3 wt. % of EGMA could offset the adverse effect of RDP on impact strength. Advantageously, RDP improved both melt flow and flame resistance. Surprisingly, melt flow was only slightly reduced by the presence of EGMA (Ex. 4 vs. Comp. Ex. 4, and Comp. Ex. 6 vs. Comp. Ex. 5).

Example 1 and Comparative Examples 7-8

Synergy between SEBS and EGMA was investigated. In these experiments, the total amount of SEBS and EGMA was kept constant at 9.2 parts by weight, however Comp. Ex. 7 had 9.2 parts SEB, Comp. Ex. 8 had 9.2 parts EGMA, and Ex. 1 had 6.2 parts SEBS and 3 parts EGMA. The results are summarized in Table 8.

TABLE 8

| | Example | | |
|---|---|---|---|
| | E-1 | CE-7 | CE-8 |
| COMPOSITION (parts by weight) | | | |
| PPE-0.40 | 81.20 | 81.20 | 81.20 |
| RDP | 9.80 | 9.80 | 9.80 |
| SEBS | 6.20 | 9.20 | — |
| PS | 2.00 | 2.00 | 2.00 |
| EGMA | 3.00 | — | 9.20 |
| AO-1 | 0.10 | 0.10 | 0.10 |
| ZnO | 0.15 | 0.15 | 0.15 |
| ZnS | 0.15 | 0.15 | 0.15 |
| CB | 1.48 | 1.48 | 1.48 |
| Total | 104.08 | 104.08 | 104.08 |
| PROPERTIES | | | |
| MFR (g/10 min) | 8.15 | 7.91 | 4.11 |
| TE-Break (%) | 13.85 | 9.96 | 17.5 |
| Notched Izod, 23° C. (J/m) | 356 | 389 | 153 |

TABLE 8-continued

| | Example | | |
|---|---|---|---|
| | E-1 | CE-7 | CE-8 |
| Notched Izod, −30° C. (J/m) | 153 | 129 | 70.9 |
| UL94, 1.0 mm | V-0 | V-1 | V-1 |

As can be seen from Table 8, Izod impact strength at −30° C. is highest for the combination of SEBS and EGMA of Ex. 1. Moreover, a UL-94 rating of V0 was only obtained with this combination. These results indicate that there is synergy between SEBS and EGMA in terms of low temperature impact strength and flame resistance. 9.2 parts EGMA alone (Comp. Ex. 8) provided good tensile elongation, but poor notched impact strength, flame resistance, and melt flow. 9.2 parts SEBS alone (Comp. Ex. 7) provided good room temperature impact strength, but poor flame resistance and tensile elongation. Surprisingly, the combination of SEBS and EGMA provided an advantageous balance of impact strength, tensile elongation, and flame resistance that could not be obtained with either SEBS or EGMA alone.

As used herein, the term "(meth)acrylate" denotes an acrylate or a methacrylate.

As used herein, the terms "a" and "an" do not denote a limitation of quantity, but rather the presence of at least one of the referenced items. Recitation of ranges of values are merely intended to serve as a shorthand method of referring individually to each separate value falling within the range, unless otherwise indicated herein, and each separate value is incorporated into this specification as if it were individually recited. Thus each range disclosed herein constitutes a disclosure of any sub-range falling within the disclosed range. Disclosure of a narrower range or more specific group in addition to a broader range or larger group is not a disclaimer of the broader range or larger group. All ranges disclosed herein are inclusive of the endpoints, and the endpoints are independently combinable with each other.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

The invention claimed is:

1. A composition comprising, based on the total weight of the poly(phenylene ether), addition polymer, impact modifier, and flame retardant:
   40 to 90 weight percent of a poly(phenylene ether)-polysiloxane block copolymer;
   1 to 20 weight percent of an addition polymer comprising repeat units derived from a glycidyl ester of an α,β-ethylenically unsaturated acid;
   1 to 20 weight percent of an impact modifier other than the addition polymer; and
   5 to 20 weight percent of a flame retardant comprising an organophosphate ester.

2. The composition of claim 1, wherein the composition further comprises, based on the total weight of the poly (phenylene ether), addition polymer, impact modifier, flame retardant, and poly(alkenyl aromatic monomer), 1 to 20 weight percent of a poly(alkenyl aromatic monomer).

3. The composition of claim 1, wherein the poly(phenylene ether)-polysiloxane block copolymer comprises:
   a poly(phenylene ether) block and a polysiloxane block comprising 20 to 80 siloxane repeat units on average; and based on the total weight of the poly(phenylene ether)-polysiloxane block copolymer, 1 to 30 weight percent siloxane repeat units and 70 to 99 weight percent phenylene ether repeat units;
   wherein the poly(phenylene ether)-polysiloxane block copolymer has an intrinsic viscosity of 0.3 to 0.6 deciliter per gram, measured at 25° C. in chloroform.

4. The composition of claim 3, wherein the poly(phenylene ether) block comprises phenylene ether repeat units having the structure:

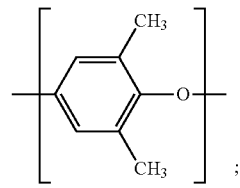

and
the polysiloxane block has the structure:

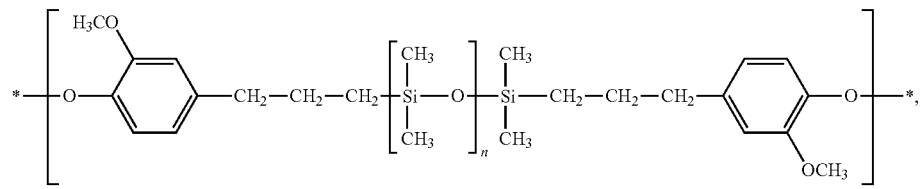

wherein n is 30 to 60.

5. The composition of claim 1, wherein the impact modifier is selected from one or more of a rubber-modified poly(alkenyl aromatic monomer) and a hydrogenated, partially hydrogenated, or non-hydrogenated block copolymer of an alkenyl aromatic monomer and a conjugated diene.

6. The composition of claim 1, wherein the addition polymer comprises 60 to 99 weight percent α-olefin repeat units, 0.1 to 20 weight percent glycidyl ester of an α,β-ethylenically unsaturated acid repeat units, and 0 to 39 weight percent vinyl ester or $C_{1-12}$ alkyl (meth)acrylate repeat units.

7. The composition of claim 1, where the addition polymer is selected from one or more of poly(ethylene-co-glycidyl methacrylate) and poly(ethylene-co-methyl acrylate-co-glycidyl methacrylate).

8. The composition of claim 1, wherein the flame retardant is selected from one or more of bisphenol A bis (diphenyl phosphate) (BPADP) and resorcinol bis(diphenyl phosphate) (RDP).

9. The composition of claim 1, comprising:
   60 to 90 weight percent of a poly(2,6-dimethyl-1,4-phenylene ether)-co-poly(dimethylsiloxane) block copolymer comprising a poly(2,6-dimethyl-1,4-phenylene ether) block and a poly(dimethylsiloxane) block comprising, on average, 20 to 80 dimethylsiloxane repeat units, and based on the total weight of the poly(2,6-dimethyl-1,4-phenylene ether)-co-poly(dimethylsiloxane) block copolymer, 1 to 30 weight percent dimethylsiloxane repeat units and 70 to 99 weight percent 2,6-dimethyl-1,4-phenylene ether repeat units; wherein the poly(phenylene ether) has an intrinsic viscosity of 0.3 to 0.6 deciliter per gram, measured at 25° C. in chloroform;

1 to 10 weight percent of an addition polymer selected from one or more of poly(ethylene-co-glycidyl methacrylate) and poly(ethylene-co-methyl acrylate-co-glycidyl methacrylate);

1 to 20 weight percent of an impact modifier selected from one or more of rubber-modified polystyrene and polystyrene-poly(ethylene-butylene)-polystyrene triblock copolymer, having a weight average molecular weight of 200,000-400,000 daltons; and 0.1 to 10 weight percent, based on the total weight of the composition, of one or more additives selected from the group consisting of flame retardants other than the organophosphate ester, fillers, processing aids, mold release agents, pigments, dyes, acid quenchers, metal deactivators, antioxidants, light stabilizers, and drip retardants.

10. The composition of claim 9, wherein the composition exhibits one or more of:

an increase in notched Izod impact strength at 23° C. of 5 to 100 percent compared to the same composition without the addition polymer, when measured with a pendulum energy of 5 ft·lbf and an impact velocity of 3.5 meters per second (m/sec) in according to ASTM D 256-10; and an increase in tensile elongation at break at 23° C. of 10 to 50 weight percent compared to the same composition without the addition polymer, when measured according to ASTM D638-10.

11. An article comprising the composition of claim 1.

12. A composition comprising, based on the total weight of the poly(phenylene ether), addition polymer, impact modifier, and flame retardant:

60 to 90 weight percent of a poly(phenylene ether) selected from one or more of a poly(2,6-dimethyl-1,4-phenylene ether) and a poly(2,6-dimethyl-1,4-phenylene ether)-co-poly(dimethylsiloxane) block copolymer comprising a poly(2,6-dimethyl-1,4-phenylene ether) block and a poly(dimethylsiloxane) block comprising, on average, 20 to 80 dimethylsiloxane repeat units, and based on the total weight of the poly(2,6-dimethyl-1,4-phenylene ether)-co-poly(dimethylsiloxane) block copolymer, 1 to 30 weight percent dimethylsiloxane repeat units and 70 to 99 weight percent 2,6-dimethyl-1,4-phenylene ether repeat units; wherein the poly(phenylene ether) has an intrinsic viscosity of 0.3 to 0.6 deciliter per gram, measured at 25° C. in chloroform;

1 to 10 weight percent of an addition polymer selected from one or more of poly(ethylene-co-glycidyl methacrylate) and poly(ethylene-co-methyl acrylate-co-glycidyl methacrylate);

1 to 20 weight percent of an impact modifier selected from one or more of rubber-modified polystyrene and polystyrene-poly(ethylene-butylene)-polystyrene triblock copolymer, having a weight average molecular weight of 200,000-400,000 daltons;

5 to 15 weight percent of a flame retardant comprising an organophosphate ester; and 0.1 to 10 weight percent, based on the total weight of the composition, of one or more additives selected from the group consisting of flame retardants other than the organophosphate ester, fillers, processing aids, mold release agents, pigments, dyes, acid quenchers, metal deactivators, antioxidants, light stabilizers, and drip retardants.

13. The composition of claim 12, wherein the composition further comprises, based on the total weight of the poly(phenylene ether), addition polymer, impact modifier, flame retardant, and poly(alkenyl aromatic monomer), 1 to 20 weight percent of a poly(alkenyl aromatic monomer).

14. The composition of claim 12, wherein the poly(phenylene ether) comprises the poly(2,6-dimethyl-1,4-phenylene ether).

15. The composition of claim 12, wherein the poly(phenylene ether) comprises the poly(phenylene ether)-polysiloxane block copolymer.

16. The composition of claim 12, wherein the poly(phenylene ether) block comprises phenylene ether repeat units having the structure:

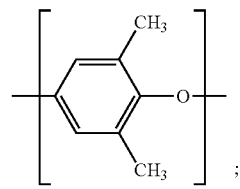

and the polysiloxane block has the structure:

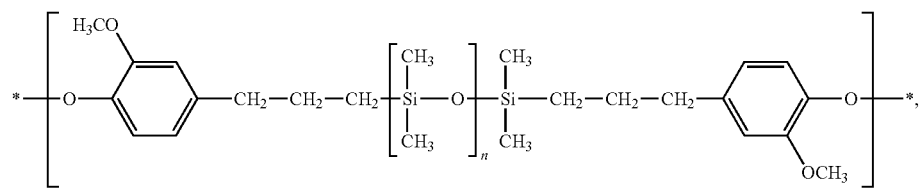

wherein n is 30 to 60.

17. The composition of claim 12, wherein the addition polymer comprises 60 to 99 weight percent ethylene repeat units, 0.1 to 20 weight percent glycidyl methacrylate repeat units, and 0 to 39 weight percent methyl acrylate repeat units.

18. The composition of claim 12, wherein the flame retardant is selected from one or more of bisphenol A bis(diphenyl phosphate) (BPADP) and resorcinol bis(diphenyl phosphate) (RDP).

19. The composition of claim 12, wherein the composition exhibits one or more of:
   an increase in notched Izod impact strength at 23° C. of 5 to 100 percent compared to the same composition without the addition polymer, when measured with a pendulum energy of 5 ft·lbf and an impact velocity of 3.5 meters per second (m/sec) in according to ASTM D 256-10; and
   an increase in tensile elongation at break at 23° C. of 10 to 50 weight percent compared to the same composition without the addition polymer, when measured according to ASTM D638-10.

20. An article comprising the composition of claim 12.

* * * * *